US010341197B2

(12) United States Patent
Terpstra et al.

(10) Patent No.: US 10,341,197 B2
(45) Date of Patent: *Jul. 2, 2019

(54) VIRTUAL SERVICE CONTROL POINT IN A NETWORK

(71) Applicant: LEVEL 3 COMMUNICATIONS, LLC, Broomfield, CO (US)

(72) Inventors: Richard Dean Terpstra, Superior, CO (US); David Allen Tschirhart, Dale, TX (US)

(73) Assignee: Level 3 Communications, LLC, Broomfield, CO (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/912,441

(22) Filed: Mar. 5, 2018

(65) Prior Publication Data
US 2018/0198689 A1    Jul. 12, 2018

Related U.S. Application Data

(63) Continuation of application No. 14/673,985, filed on Mar. 31, 2015, now Pat. No. 9,912,551.

(60) Provisional application No. 61/978,387, filed on Apr. 11, 2014.

(51) Int. Cl.
| *H04W 40/02* | (2009.01) |
| *H04W 4/16* | (2009.01) |
| *H04L 12/24* | (2006.01) |
| *H04L 29/12* | (2006.01) |
| *H04L 29/06* | (2006.01) |

(Continued)

(52) U.S. Cl.
CPC ............ *H04L 41/50* (2013.01); *H04L 61/106* (2013.01); *H04L 65/103* (2013.01); *H04L 65/1063* (2013.01); *H04L 65/1069* (2013.01); *H04M 3/367* (2013.01); *H04M 3/42306* (2013.01);
(Continued)

(58) Field of Classification Search
CPC ....... H04L 41/50; H04L 47/122; H04L 47/19; H04L 61/106; H04L 65/103; H04L 65/1063; H04W 4/16
See application file for complete search history.

(56) References Cited

U.S. PATENT DOCUMENTS 6,891,941 B1    5/2005   Barthel et al.
8,570,873 B2   10/2013   Lawson et al.
(Continued)

OTHER PUBLICATIONS

Extended European Search Report, dated Nov. 22, 2017, Application No. 15777377.1, filed Mar. 31, 2015; 7 pgs.
(Continued)

*Primary Examiner* — Liton Miah

(57) ABSTRACT

Aspects of the present disclosure involve systems, methods, computer program products, and the like, for implementing a virtual service control point in a telecommunications network. In one embodiment, the system and methods involve implementing the functions of a service control point (SCP) device on one or more computing devices, such as application servers of the network, of the telecommunications network to create a virtual service control point device. In one embodiment, the virtual SCP may translate toll-free communications, such as 8xx based telephone communications, into a destination address associated with a customer of the network. In addition to resolving communications into a destination address or number, a virtual SCP instantiated in a network may provide one or more routing rules or features for such communications to a customer.

19 Claims, 5 Drawing Sheets

(51) Int. Cl.
*H04M 3/36* (2006.01)
*H04M 3/42* (2006.01)
H04L 12/803 (2013.01)
H04L 12/801 (2013.01)

(52) U.S. Cl.
CPC ............ *H04W 4/16* (2013.01); *H04L 47/122* (2013.01); *H04L 47/19* (2013.01); *H04M 2207/12* (2013.01)

(56) References Cited

U.S. PATENT DOCUMENTS

| | | |
|---|---|---|
| 8,619,961 B2 | 12/2013 | Starling et al. |
| 8,942,683 B2 | 1/2015 | Doerr |
| 9,307,377 B2 | 4/2016 | Xu |
| 2007/0167166 A1 | 7/2007 | Fleischer |
| 2013/0322268 A1 | 12/2013 | Shaw et al. |
| 2014/0098945 A1 | 4/2014 | Terpstra et al. |
| 2015/0296436 A1 | 10/2015 | Terpstra et al. |

OTHER PUBLICATIONS

International Preliminary Report on Patentability, dated Oct. 12, 2016, Int'l Appl. No. PCT/US15/023469, Int'l Filing Date Mar. 30, 2015; 8 pgs.
International Search Report, dated Jul. 10, 2015, Int'l Appl. No. PCT/US15/023469, Int'l Filing Date Mar. 31, 2015; 3 pgs.
Written Opinion of the International Searching Authority, dated Jul. 10, 2015, Int'l Appl. No. PCT/US15/023469, Int'l Filing Date Mar. 31, 2015; 6 pgs.

VIRTUAL SERVICE CONTROL POINT IN A NETWORK

CROSS-REFERENCE TO RELATED APPLICATIONS

This application is a continuation of and claims the benefit of priority from U.S. patent application Ser. No. 14/673,985, titled "VIRTUAL SERVICE CONTROL POINT IN A NETWORK," filed Mar. 31, 2015, the entire contents of which are fully incorporated by reference herein for all purposes. Application Ser. No. 14/673,985 claims priority under 35 U.S.C. § 119(e) from U.S. Provisional Application No. 61/978,387, titled "VIRTUAL SERVICE CONTROL POINT IN A NETWORK", filed Apr. 11, 2014, the entire contents of which are fully incorporated by reference herein for all purposes.

FIELD OF THE DISCLOSURE

Embodiments of the present invention generally relate to systems and methods for implementing a telecommunications network, and more specifically for providing a virtual service control point device within or associated with the telecommunications network to control routing of communications of the network.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide toll-free communications in which a called customer may pay for all long-distance telephone calls made to the customer or customer's network. In general, toll-free communications allow a customer to the network to receive calls from disparate locations around the country without passing the cost of such long-distance calls to callers to the customer.

Telecommunication networks may also provide one or more routing features to those customers that utilize the telecommunication network. For example, a telecommunications network may provide routing based on the number dialed or routing based on inputs provided by the caller, such as dial-tone multi frequency (DTMF) routing or voice inputs provided by the caller. In general, such routing features of the telecommunications network are handled by a service control point device in the network. Such service control point devices in the network typically provide the routing features for several customers of the network. As such, as more and more customers are added to the network, more service control point devices must be included in the network. In addition, because each service control point device is limited to processing or handling a specific number of concurrent calls, heavy traffic from one customer may negatively affect the performance of the service control point in relation to other customers.

It is with these and other issues that various aspects of the present disclosure were developed.

SUMMARY

One implementation of the present disclosure may take the form of a telecommunications network. The network comprises at least one application server with instructions stored thereon that, when executed by the at least one application server, perform certain operations. These operations include receiving an incoming communication from a user of the telecommunications network, the communication comprising an identifier associated with a client of the telecommunications network and obtaining a list of at least one routing feature associated with the client of the telecommunications network, wherein the at least one routing feature is a maximum concurrent calling feature configured to limit a number of concurrent communications to the client of the telecommunications network. In addition, the operations include translating the incoming communication to a destination address associated with the client of the telecommunications network, the destination address associated with the dialed telephone number and the at least one routing feature associated with the client, and transmitting one or more redirect messages to the telecommunications network to redirect the communication to the destination address associated with a client of the telecommunications network.

Another implementation of the present disclosure may take the form of a virtual service control point of a telecommunications network. The virtual service control point includes a network interface to receive a plurality of incoming communications from a plurality of users of the telecommunications network, a translator component to translate the plurality of incoming communications to a destination address associated with a client of the telecommunications network and transmit one or more redirect messages to the telecommunications network through the network interface to redirect the plurality of communications to the destination address associated with a client of the telecommunications network, and a controller component to obtain a list of at least one routing feature associated with the client of the telecommunications network and apply the at least one routing feature to the plurality of received incoming communication. Further, the at least one routing feature applied by the controller component may be a maximum concurrent calling feature configured to limit a number of concurrent communications to the client of the telecommunications network.

Yet another implementation of the present disclosure may take the form of a method for operating a telecommunications network. The method includes the operations of receiving a plurality of incoming communications from a plurality of users of the telecommunications network, the plurality of incoming communications comprising a dialed telephone number associated with a client of the telecommunications network and obtaining a list of at least one routing feature associated with the client of the telecommunications network, wherein the at least one routing feature is a maximum concurrent calling feature configured to limit a number of concurrent communications to the client of the telecommunications network. In addition, the method includes the operations of translating the incoming plurality of toll-free communications to a destination address associated with the client of the telecommunications network based at least on the at least one routing feature, the destination address associated with the dialed telephone number, and transmitting one or more redirect messages to the telecommunications network to redirect the communication to the destination address associated with a client of the telecommunications network.

DETAILED DESCRIPTION

Figure 1:
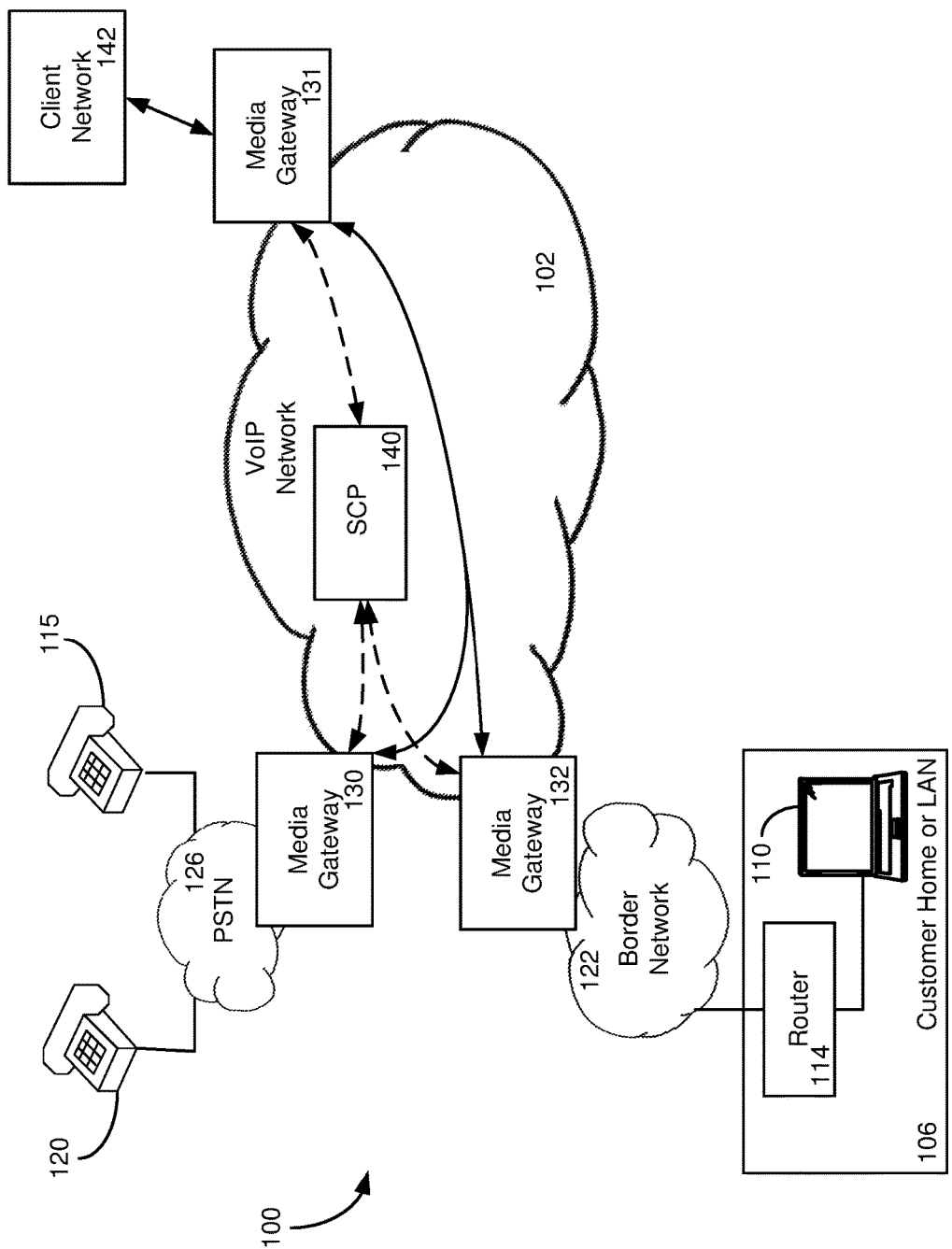
FIG. 1 schematic diagram illustrating an exemplary Voice over Internet Protocol (VoIP) operating environment in accordance with one embodiment.

Aspects of the present disclosure involve systems, methods, computer program products, and the like, for implementing a virtual service control point in a telecommunications network. In one embodiment, the system and methods involve implementing the functions of a service control point (SCP) device on one or more computing devices, such as application servers of the network, of the telecommunications network to create a virtual service control point device. In one embodiment, the virtual SCP may translate toll-free communications, such as 8xx based telephone communications, into a destination address associated with a customer of the network, such as the customer's Public Switched Telephone Network (PSTN) number, Internet Protocol (IP) address or Time Division Multiplex (TDM) destination so that the toll-free communication may be routed through the telecommunications network to the customer. In addition to resolving communications into a destination address or number, a virtual SCP instantiated in a network may provide one or more routing features for such communications to a customer.

Instantiating one or more virtual SCPs on the network may provide the network with additional flexibility and routing capabilities over the traditional hardware-based SCP device. For example, a virtual SCP may provide traditional SCP services to a customer of the telecommunications network that are scaled to meet the customer's needs. For example, because the ports available for a virtual SCP to provide services may be adjusted based on the call volume for a particular customer, the routing features available to such communications may also be scaled in response to the call volume of the customer. Further, because a virtual SCP may be unique to each customer (in contrast to a hardware SCP that typically serves several customers to the network), the possibility of one customer's traffic affecting the performance of other customer's traffic is lessened. Also, a virtual SCP may be instantiated in one or more networks to provide the networks with flexibility in configuring the networks. For example, a virtual SCP may be instantiated on a telecommunications network, in a customer's own network, or in a combination of the telecommunications network and the customer's own network. Further still, a virtual SCP provides additional flexibility in the manner in which the customer is billed for the SCP service provided by the telecommunication network. For example, the number of communications present in the network for a particular customer of a telecommunications network is fixed or set at any one time in a traditional hardware-based SCP. In a virtual SCP, on the other hand, the number of communications handled by the network for a particular customer may be adjusted in real time or close to real time. Thus, the customer may be billed for actual communications handled by the network, rather than billing the customer for a potential volume of communications. Thus, the billing procedure for the network becomes more accurate with a virtual SCP configuration in the network. In a similar manner, the number of concurrent communications provided to any one number or customer network may be limited for more accurate network management. These and other benefits obtained from a virtual SCP in a telecommunications network are discussed in more detail below.

FIG. 1 illustrates an exemplary operating environment 100 for providing a virtual SCP to one or more customers of a telecommunications network. The environment 100 provides for establishing communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that portions of the network 102 may include non IP-based routing. For example, network 102 may include devices utilizing time division multiplexing (TDM) or plain old telephone service (POTS) switching. In general, the network 102 of FIG. 1 may include any telecommunication network devices known or hereafter developed.

The VoIP network 102 includes numerous components such as, but not limited to gateways, routers, and registrars, which enable communication across the VoIP network 102, but are not shown or described in detail here because such devices and network configurations are readily understand by those of skill in the particular art. More relevant to this description is the interaction and communication between the VoIP network 102 and other entities, such as the one or more customer home or business local area networks (LANs) 106, where a user of the network will connect with the network and, more particularly, a virtual SCP 140 instantiated in the network.

Customer network 106 can include communication devices such as, but not limited to, a personal computer or an IP-based telephone device 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be wireless (e.g., cellular) telephone, smart phone, tablet or portable laptop computer. Other communication devices 115, 120 (such as analog telephones or other communication devices) may connect to the network 102 through a public switched telephone network (PSTN) for providing communications to the network.

The customer network 106 typically connects to the VoIP network 102 via a border network 122 or access network, such as one provided by an Internet Service Provider (ISP). The border network 122 is typically provided and maintained by a business or organization such as a local telephone company or cable company. The border network 122 may provide network/communication-related services to their customers. In contrast, the communication device 120, 115 accesses, and is accessed by, the VoIP network 102 via the PSTN 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a user of the network 102 utilizes one or more of the communication devices to transmit a communication to the network. For example, the user may place a telephone call to the network 102 from a telephone 120 associated with the network through the PTSN 126 and media gateway 130. In another example, the user may place a telephone call to the network 102 from an IP-based communication device 110 associated with the network through the border network 122 and the media gateway 132. Upon receipt, the network 102 routes the communication to a routing device 140 or routing devices integrated within the network 102. In one example, the routing device may be an SCP 140 type device. In one particular embodiment, the SCP 140 is a virtual machine embodied on one or more computing devices in the network 102. For example, the virtual SCP 140 may be embodied on one or more application servers integrated into the network 102. It should be appreciated that the virtual SCP 140 may be a part of the network 102, may be separate from the network, or may have portions deployed in the network and out of the network. In addition, the SCP 140 may be resident on one or more components of the VoIP network 140, including several instances of the SCP 140 integrated throughout the network 102. Thus, although only a single instance of a SCP 140 is illustrated in FIG. 1, any number of routing devices may be present in the network 102.

In general, the SCP 140 is configured to receive one or more communications, determine a destination customer, a destination network, or communication device to which the toll-free communication is intended, and provide a translation of the incoming communication into a destination address associated with the network. In particular, the user of the network 102 uses a communication device 110, 115, 120 to transmit a communication to the network, such as a telephone call. The communication may include a common number or destination for any number of users connected to the network 102. In one particular example, the user dials a 8xx based number in the communication device 110, 115, 120 that is associated with a particular customer, customer network, or customer device in communication with the network. The communication is received by the media gateway (130, 132) and routed through the network 102 to the SCP 140. The SCP 140 receives the communication and, in response and described in more detail below, determines a destination or customer network 142 to which the communication is to be routed based at least on one or more routing features applied to the communication.

In one embodiment, the communication is associated with a particular client or customer of the network 102 such that a destination address for the communication can be determined from the incoming communication. Thus, the SCP 140 may include a database that correlates information included with the toll-free communication with a destination network 142 or destination communication device connected to the network 102. Further, the SCP 140 may respond to receiving the communication by providing one or more instructions to re-route the communication to the client network 142 or media gateway 131 associated with a client network for connection to the client network. In a Session Initiation Protocol (SIP) based network, the SCP 140 may provide one or more SIP refer commands to re-route the communication to the client network 142. In other words, the SCP 140 transmits a SIP refer command to the media gateway 132 that includes the destination customer network 142 or media gateway 131 associated with the client network. In response, the media gateway 132 transmits the communication to the media gateway 131 associated with the client network 142 for connection with the client network. Once connected, the user and the client network 142 may exchange communications through the network 102.

The SCP 140 may utilize many routing features when determining to which customer the communication is routed. For example, the communication may be routed to a customer identified through information received from the incoming communication, such as a dialed telephone number or other identifier, or from information provided by the caller through inputs, such as DTMF, menu routing, account code and/or personal identification number, etc. In another example, the communication may be time routed, such as day-of-the-week, date, special day or time, etc. In yet another example, the communication may be routed to any number of destinations or customers based on percentages of connected calls to that destination or customer. Other routing features or methods through which the communication is routed may be utilized by the SCP 140 to determine the destination of the communication.

The routing features discussed above may be utilized by the SCP 140 independently or in conjunction with one another. For example, the SCP 140 may utilize logic routing based on information included with the call and map that to a time of day routing. Other routing features may also be considered before the final determination of the communication destination by the SCP 140 for any communication received at the telecommunications network.

Typically, the SCP 140 is a hardware telecommunications device that determines routing of communications for several clients of the network 102 based on one more routing features. Thus, communications intended for several clients of the network may be handled by a single hardware SCP 140 device. Thus, a high number of communications for one particular customer of the network may negatively affect communications for other customers of the network connected through the SCP device. In one embodiment of the present disclosure, however, the SCP 140 may be instantiated as a virtual machine of the network 102. That is, one or more computing devices of the network, such as general purpose application servers, may execute one or more instructions to perform the functions of the SCP 140 telecommunications device in the network. By providing the SCP 140 as a virtual machine executed by one or more computing devices rather than a stand-alone hardware device, several advantages may be realized.

One advantage of a telecommunications network that utilizes a virtual SCP 140 is the capability to scale one or more of the SCP features for each client of the network. For example, a particular client to the network 102 may have any number of incoming communications to the network at any one time. In an environment where the SCP resources are shared between multiple clients to the network 102, the SCP may become overwhelmed by the incoming communications to the particular client, thereby negatively impacting the performance of the SCP for the other clients to the network associated with that SCP. In a virtual SCP environment, however, each client to the network 102 that utilizes the features of an SCP may have a virtual SCP 140 associated with each client. In addition, each of the multiple virtual SCPs of the network associated with the multiple clients may be scalable to provide each client with enough bandwidth to accommodate the incoming communications. Because each client may have a dedicated virtual SCP 140 to provide the SCP features for incoming communications intended for the client, the occurrence of a large number of incoming communications may not negatively affect the SCP services provided to other clients of the network 102. Rather, the resources provided to the particular client by the virtual SCP 140 may be scalable in response to the number of incoming communications to the particular client. It should be appreciated, however, that a virtual SCP 140 of the network 102 may also be shared among multiple clients and it is not required that each client have a dedicated virtual SCP.

In addition to providing protection from overloading of the SCP of the network 102 by incoming communications to a particular client, the virtual SCP 140 also provides client-specific features to the clients associated with the SCP. One or more of the client-specific features may be routing features that determine how a received communication is routed to the client. For example, each virtual SCP 140 of the network 102 may include any number of features available to clients of the network, such as maximum number of concurrent calls, direct connect to an operation associated with the client, routing based on time such as time-of-day routing, and the like. Different clients to the network 102 may want to utilize different features offered by the SCP. Through the multiple virtual SCPs 140 of the network 102, each client can customize the features provided by the SCP associated with the client for one or more of the incoming communications. For example, a first client may have a maximum capacity of several hundred concurrent calls, while a second client may have a maximum capacity of only a few concurrent calls. Further, the capacity of concurrent calls may be determined by a time routing feature specific to each client. The variability in features provided by the SCP may be realized in the virtual SCP environment. Some of these features are described in more detail below with relation to FIGS. 2-4.

Additional features may also be incorporated into the virtual SCP 140 of the network 102. In general, because the virtual SCP 140 operates as a virtual state machine, features based on a state of the communication between the user and the client network may be incorporated into the virtual SCP. In the example where the SCP is a hardware-based device, such state-based features are not available as the hardware SCP device is not a state-based device. For example, the virtual SCP 140 may be configured to prompt one or more responses from a caller to a particular customer of the network 102. Such responses may be received through a touchpad of the caller's communication device or through one or more voice recognized responses. Based on the responses received by at the SCP 140, various states of the SCP may be entered to provide certain features to the communication. In another example, the SCP 140 may place the incoming communication into different states based on one or more configurations of the SCP and features available to the customer of the network. In this manner, state-based features may be integrated into the execution of the virtual SCP 140 program of the network for the particular clients of the network.

In one particular embodiment of the present disclosure, many or all of the features of the SCP may be included in the client network 142 rather than in the VoIP network 102. In other words, the virtual SCP may be executed by one or more components of the client network 142 to provide the client with one or more of the SCP features. In this embodiment, the VoIP network 102 may reroute any incoming communications from a user to the media gateway 131 and/or the client network 142, such as through a SIP-based redirect command to the incoming communication. The function and features of the virtual SCP on the client network 142 may be similar to the virtual SCP described above with reference to the network 102. In this manner, much of the network processing power devoted to the virtual SCP 140 may be offloaded to the client network 142. Further, a virtual SCP integrated into the client network 142 may be managed and controlled by the client to provide tailored features of the virtual SCP for the client.

Figure 2:
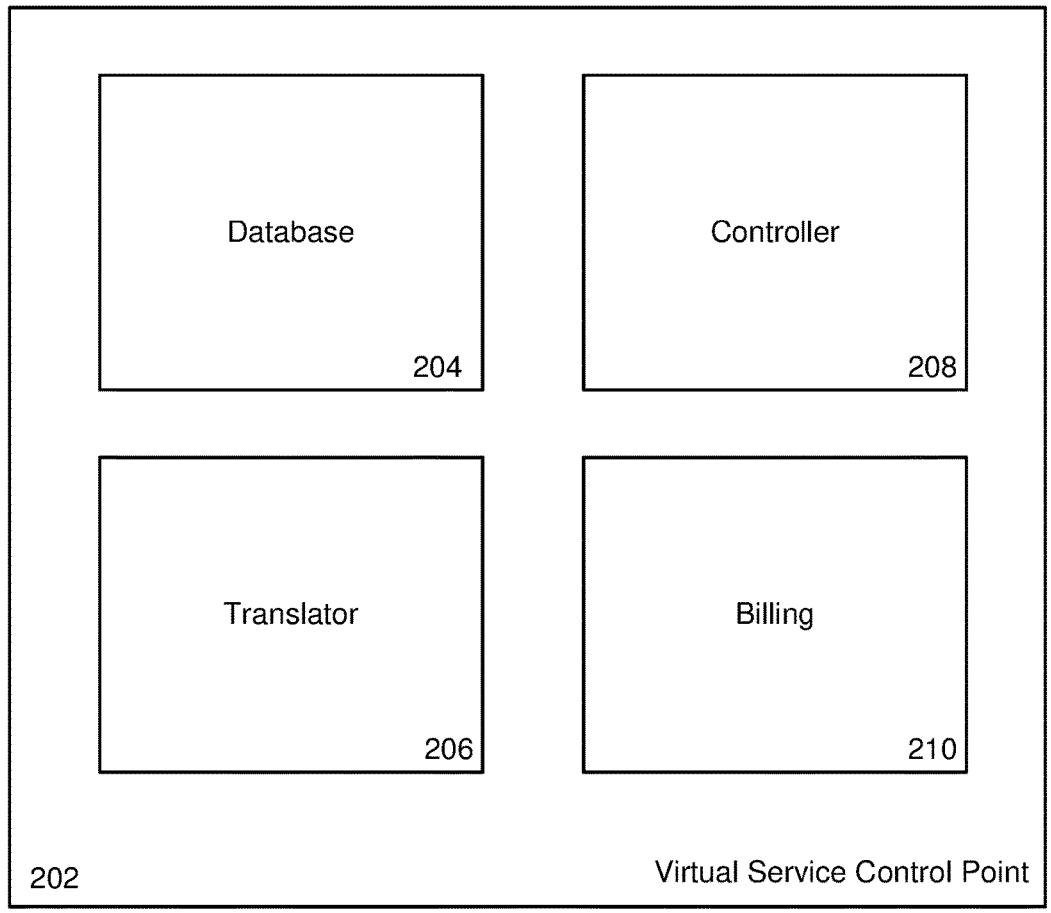
FIG. 2 is a schematic diagram illustrating an exemplary virtual service control point system in a telecommunications network.

As mentioned above, the VoIP network 102 may include one or more components that facilitate the virtual SCP 140 of the network. FIG. 2 is a schematic diagram illustrating an exemplary virtual SCP in a telecommunications network. In general, the virtual SCP 202 of FIG. 2 includes several components, including (but not limited to), a database 204, a translator component 206, a controller component 208, and a billing component 212. Additional or fewer components may be included in the virtual SCP 202. Further, the components of the virtual SCP 202 may be included in a single device within the VoIP network 202 or may be included in any number of components of the network. In particular, the components of the virtual SCP 202 may include instructions executed by a computing device. As such, the instructions may be stored on and/or executed by any number of computing components of the network 102. The operations of each of the components of the virtual SCP 202 may be performed through a series of software instructions, hardware components or a combination of both software and hardware. The general operations of each component of the virtual SCP 202 are described in more detail below.

In general, the database 204 and the translator component 206 of the virtual SCP 202 operate in tandem to provide SCP translation of communications to route the communications to a destination client. In particular, an incoming communication is received at the virtual SCP 202 as described above. Upon receipt, the SCP 202 utilizes the database 204 and a translator 206 to determine a destination number, destination network, customer identification, network address, or the like associated with the destination of the incoming toll-free communication. In one example, the incoming communication may be a toll-free 8xx-type toll free number. The incoming number may be associated with a client network 142 that intends to receive the communication. The correlation between the incoming communication and the destination number or address may be maintained in the database 204 of the virtual SCP 202. In addition, the virtual SCP 202 utilizes the translator component 206 to translate the incoming communication to re-route the communication to the client network 142. In one example, the virtual SCP 202 transmits one or more SIP commands that re-routes the communication to the client network 142.

In routing the communication, the translator component 206 may consider any number of routing rules. For example, the communication may be routed to a customer identified through information received from the incoming communication, such as a dialed telephone number or other identifier, or from information provided by the caller through inputs, such as DTMF, menu routing, account code and/or personal identification number, etc. In another example, the translator component 206 may consider a time-based routing rule, such as the day-of-the-week the communication is received, the date, a special day or time, etc. In yet another example, the translator 206 may route the communication to any number of destinations or customers based on percentages of connected calls to that destination or customer.

In addition and as explained in greater detail below, the translator component 206 may consider a concurrent call limiting routing rule to limit a communication to a customer based on the number of concurrent communications already connected to the customer. Such concurrent call limitations may be applied to a single destination in the network, a group of destinations associated with a client (such as in an Enterprise network configuration), a single dialed telephone number, a group of dialed numbers, etc. Also, the translator component 206 may consider any number of routing rules, features, and/or distribution logic when translating the received communication into a destination in the network.

The virtual SCP 202 may also include a controller component 208. In general, the controller component 208 of the virtual SCP 202 operates to control the various functions and features of the virtual SCP, including communication between the various computing devices that may be executing the virtual SCP. Further, the virtual SCP 202 may also include a billing component 210. The billing component may be configured to track usage of the virtual SCP by one or more clients to the network 102 for billing purposes. One particular method for billing executed at least partially by the billing component is described in more detail below with reference to the method of FIG. 3.

Figure 3:
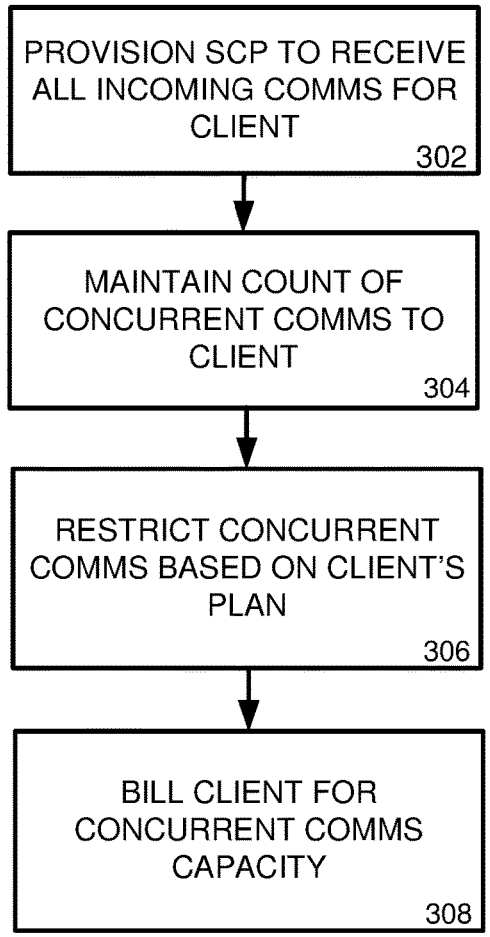
FIG. 3 is a flowchart illustrating a method for providing a concurrent billing plan utilizing a virtual service control point system in a telecommunications network.

The virtual SCP 140 of the network 102 provides the network with flexibility in tracking usage of the SCP for a client to the network in relation to one or more billing plans for a client of the network. For example, FIG. 3 is a flowchart illustrating a method for providing a concurrent billing plan utilizing a virtual service control point system in a telecommunications network. In one embodiment, the operations of FIG. 3 are performed by one or more of the components of the virtual SCP system 202 and/or the network, such as the controller component 208 and/or the billing component 210. In another embodiment, one or more of the operations of FIG. 3 are performed by an application server of the network 102 that is provisioned to receive incoming communications to the network.

Beginning in operation 302, the network 102 provisions the virtual SCP (or application server, depending on the embodiment) to receive all or some of the incoming communications for a particular client. For example, the virtual SCP 140 of the network 102 may be configured to receive each communication from users of the network intended for the particular client's network, an Enterprise network associated with the client, and/or one or more destination telephone numbers associated with the client. One benefit to utilizing a virtual SCP 140 to receive each communication in operation 302 is to provide scalability to the number of concurrent communications being transmitted to the client at any one time. In particular, a virtual SCP 140 may provide routing features to each communication of a particular client as the communications are received at the SCP. In this manner, the routing features may be applied based on the number of communications received and not with a pre-set limit to the number of communications supported by the virtual SCP 140. For example, a limit on the number of concurrent communications provided to the destination client through the virtual SCP 140 may be applied as communications intended for the client are received at the virtual SCP.

In operation 304, the virtual SCP maintains a count or other indication of the number of concurrent communication sessions being transmitted to and/or from the particular client. In other words, at any given time, the client may be conducting any number of communication sessions with users of the network. The virtual SCP may monitor such communications and determine how many concurrent sessions are present at any one time. Because the virtual SCP may be commissioned to receive each incoming communication intended for the particular client, the virtual SCP may accurately determine the number of concurrent communications or sessions. This capability is generally not available from a traditional hardware-based SCP as any number of SCPs may be deployed within the network 102 without any communication between the SCPs.

In addition, the virtual SCP 140 may also restrict the number of concurrent communications to a particular client based on one or more business agreements between the network 102 and the particular client. For example, a client may purchase a toll-free plan from a network administrator that provides the clients with a certain number of toll-free concurrent communication sessions through the network. A larger client may purchase a plan with more concurrent sessions than a smaller client. In operation 306, the virtual SCP 140 of the network 102 may limit the number of concurrent communication sessions of the client based on the purchased plan by the client. Further, the number of allowed concurrent sessions between the client and the network 102 may be limited based on time of day, day of the week, current available capacity, and the like. For example, the client may request that more concurrent sessions be available during peak business hours, but fewer during other times of the day. In this manner, the number of concurrent communication sessions that the client is restricted to may vary daily or weekly. In this manner, the limitation of concurrent communications to the client may be used in conjunction with any other routing rules to provide distribution logic to the virtual SCP. Thus, the virtual SCP may consider origin routing based on information included with the communication, time routing based on day and time of day information, concurrent call limiting routing, and/or distribution routing top multiple destinations utilizing percentages, with one routing feature mapping into the next routing feature until a destination is determined. Regardless of the type of business agreement between the client and the network administrator, the virtual SCP 140 (or application server in one embodiment) may restrict the number of concurrent communication sessions the network 102 will support for that particular client at any one time, with or without the application of other routing features of the SCP.

Further, the restriction of the number of concurrent calls to a client may be apply to any iteration or type of the client's network. For example, virtual SCP may limit the maximum number of concurrent calls to a client number, a block of client numbers, a terminating destination, a block of terminating destinations, or any other destination client. Further still, the restriction of concurrent calls may apply to several clients such that the block of client numbers or terminating destinations may be comprised of more than one client to the network, such as for a group of clients of a single Enterprise. In general, the restriction of concurrent calls may apply to any number of clients to the network and may be based on any agreement, such as a time-based limitation.

Because the virtual SCP provides a centralized virtual component within the network 102 through which all communications intended for a particular client may be transmitted as described above, an administrator of the network can provide billing plans based on a number of concurrent communication sessions. Through hardware-based SCP device, such services are typically billed based on minutes of use (MOU) as that was the only method through which the hardware-based SCP can track the communications utilized by the client. By utilizing the virtual SCP (or application server in one embodiment), however, the network 102 may bill the client based on the number of concurrent communication sessions utilized by the client during use of the virtual SCP. Thus, in operation 308, the network administrator bills the client based on the number of concurrent communication sessions as agreed upon by the client and the network administrator. This type of billing is known as concurrent call path billing (CCP).

Figure 4:
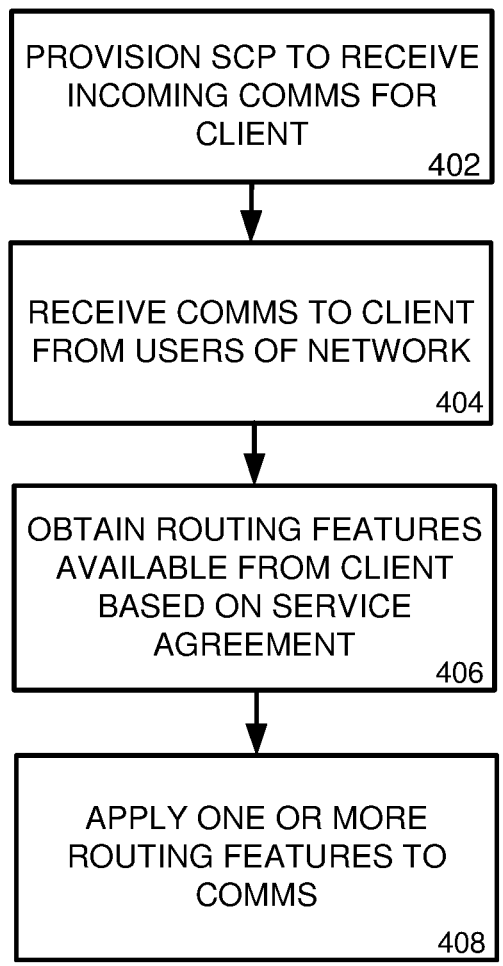
FIG. 4 is a flowchart illustrating a method for a virtual service control point component of a telecommunications network to route a call to a client network through one or more routing features.

FIG. 4 is a flowchart illustrating a method for a virtual service control point component of a telecommunications network to route a call to a client network through one or more routing features. Similar to the method described above with reference to FIG. 3, the operations of FIG. 4 are performed by one or more of the components of the virtual SCP system 202 and/or the network, such as the controller component 208, the translator component 206, and/or the billing component 210. In another embodiment, one or more of the operations of FIG. 4 are performed by an application server of the network 102 that is provisioned to receive incoming communications to the network.

Beginning in operation 402, the virtual SCP is provisioned to receive all or some communications intended for a particular client or client network of the telecommunications network. In one embodiment, the telecommunications network is provisioned to route received toll-free communications to the virtual SCP. In operation 404, the virtual SCP receives one or more communications intended for the client network or client communication device from one or more users of the telecommunications network.

In operation 406, the virtual SCP may obtain a list of routing features available for the client to route the received communication. In particular, the client to the telecommunications network may enter into one or more service agreements with the network to provide one or more routing features to the client by the network. The service agreement may include one or more routing features, such as maximum number of concurrent calls, time-based routing, routing to multiple destinations based on percentages, and the like. Further, each of the routing features may be applied to one or more of the client devices connected to the network, such as a single destination, an enterprise network, a group of dialed numbers, and the like. Not all features may be available to all clients of the network that have a service agreement with the network. Rather, the number and types of routing options available may vary from client to client, generally based on the service agreement between the parties. Thus, the virtual SCP may obtain a list of such routing features and/or routing rules available to the particular client to which the communication is intended.

Obtaining the list of routing features available to the particular client may include querying the client or client network. In another example, particulars of the service agreement between the client and the network may be received and stored at the virtual SCP or at a central database. Thus, obtaining the list of routing features or rules may include accessing the central database for the available rules for routing a received communication. In one embodiment, the central database is the database 204 of the virtual SCP 202.

In operation 408, the virtual SCP applies one or more of the routing features to the received communication. In general, the features applied to the communication are one or more of the routing features included in the list of features available for that particular client. Routing rules or distribution trees not available to the client may not be applied to the communication intended for the client network.

As mentioned above, the virtual SCP 140 may route a communication to a client network 142 for connection to a client device. In one embodiment, the communication may be routed to a particular portion of the client's network 142. For example, based on the number dialed, the call may be routed to a sales department associated with the client network 142. The virtual SCP 140 may be configured to determine the number dialed and provide the routing to transmit the communication to the proper department or end device within the client's network 142. Further, one or more components of the virtual SCP 140 may be instantiated on the client network 142. Thus, the client network 142 may be configured to receive a communication from the network 102 and, utilizing a virtual SCP or a portion of the virtual SCP 140 instantiated on the client network, route the communication to the particular portion of the client network. In this manner, the virtual SCP may be utilized by the client to streamline the routing of incoming communications. This may replace or supplement caller prompts typically utilized to determine the portion of the client network to which the communication is routed.

Figure 5:
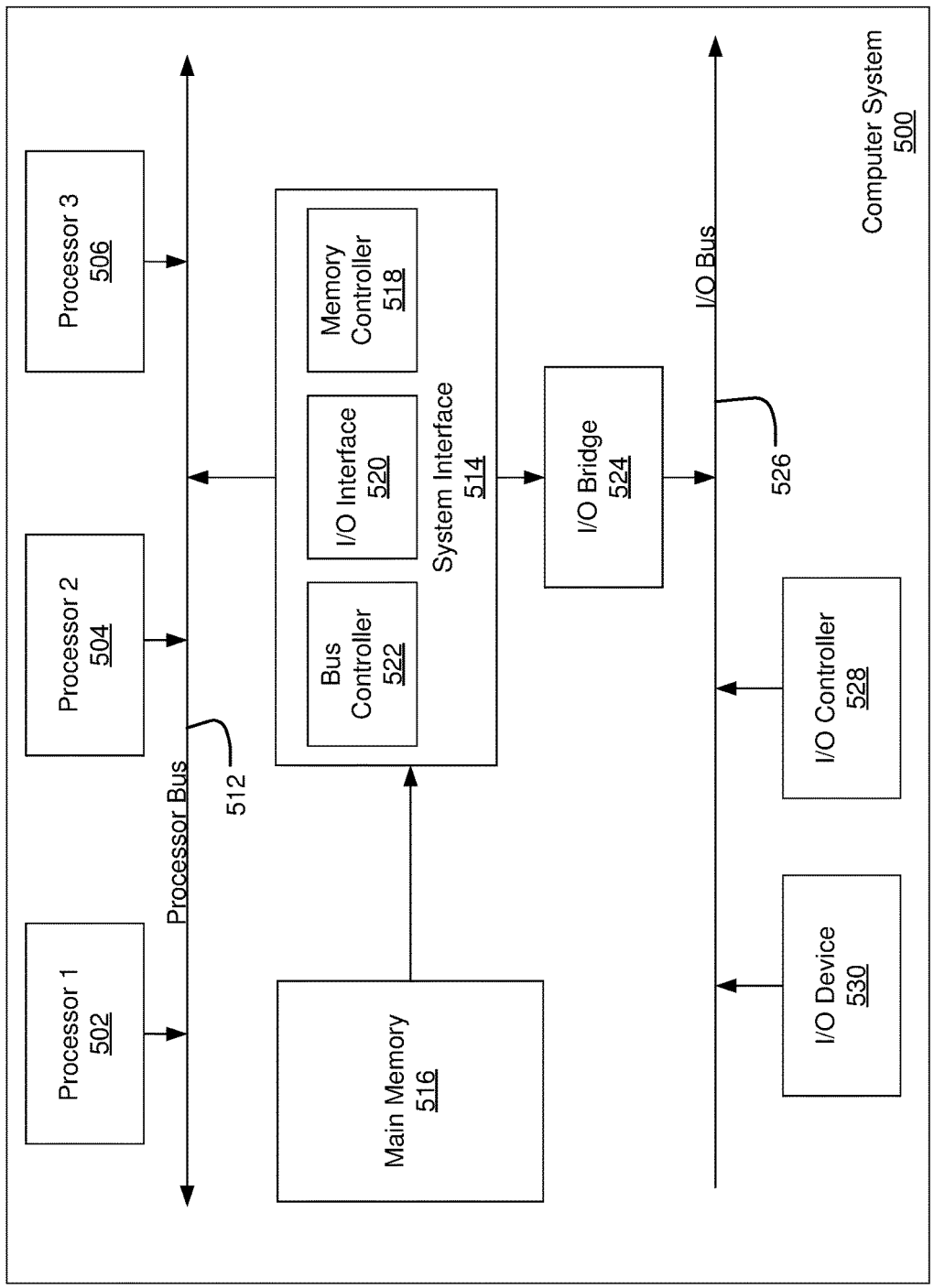
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be used to implement the various components of the virtual service control point 140 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. The term "exemplary" as may be used herein means "serving as an example, instance, or illustration," and is not meant to be construed as preferred or advantageous over other exemplary aspects. Thus, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A telecommunications network comprising:
   at least one application server with instructions stored thereon that, when executed by the at least one application server, cause the at least one application server to perform the operations of:
   receiving an incoming communication from a user of the telecommunications network, the communication comprising an identifier associated with a client of the telecommunications network;
   obtaining a list of at least one routing feature associated with the client of the telecommunications network, wherein the at least one routing feature is a maximum concurrent calling feature configured to restrict a number of concurrent communications to the client of the telecommunications network to a limit;
   applying the at least one routing feature to the incoming communication;
   translating the incoming communication to a destination address associated with the client of the telecommunications network, the destination address associated with the dialed telephone number and the at least one routing feature associated with the client; and
   upon determining that the incoming communication would not cause the concurrent communications to the client of the telecommunications network to exceed the limit, transmitting one or more redirect messages to the telecommunications network through a network interface to redirect the communication to the destination address associated with a client of the telecommunications network.

2. The telecommunications network of claim 1 wherein the identifier associated with the client is a dialed telephone number and the incoming communication is a toll-free communication.

3. The telecommunications network of claim 1 wherein the instructions stored on the at least one application server, when executed by the at least one application server, further cause the at least one application server to perform the operations of:
   receiving a plurality of incoming communications from a plurality of users of the telecommunications network; and
   adjusting a billing policy for the client of the telecommunication network based on the plurality of incoming communications.

4. The telecommunications network of claim 1 wherein the list of the at least one routing feature associated with the client of the telecommunications network is obtained from a database in communication with the at least one application server.

5. The telecommunications network of claim 4 wherein the list of the at least one routing feature associated with the client of the telecommunications network is based at least on a service agreement between the client of the telecommunications network and an administrator of the telecommunications network.

6. The telecommunications network of claim 1 wherein the one or more redirect messages comprises a Session Initiation Protocol (SIP) refer message to redirect the communication to the client of the telecommunications network.

7. The telecommunications network of claim 1 wherein the client of the telecommunications network comprises at least one of: a single client number, a block of client numbers, a terminating destination of the telecommunications network, a block of terminating destinations of the telecommunications network, or an Enterprise network.

8. The telecommunications network of claim 1 wherein the maximum concurrent calling feature comprises a first limit of concurrent communications to the client for a first time of day and a second limit, different from the first limit, for a second time of day.

9. The telecommunications network of claim 1 wherein the at least one application server comprises multiple computing devices, and wherein the at least one application server is configured to receive all incoming communications for the client on the telecommunications network.

10. The telecommunications network of claim 9 wherein the at least one application server receives only incoming communications for the client on the telecommunications network.

11. A virtual service control point of a telecommunications network comprising:
   a network interface to receive a plurality of incoming communications from a plurality of users of the telecommunications network;
   at least one processor operatively connected to the network interface;
   memory operatively connected to the at least one processor and storing instructions that, when executed by the at least one processor, cause the at least one processor to perform a method, the method comprising:
      translating the plurality of incoming communications to a destination address associated with a client of the telecommunications network;
      obtaining a list of at least one routing feature associated with the client of the telecommunications network;
      applying the at least one routing feature to the plurality of received incoming communication, wherein the at least one routing feature applied is a maximum concurrent calling feature configured to restrict a number of concurrent communications to the client of the telecommunications network to a limit; and
      upon determining that a first incoming communication would not cause the concurrent communications to the client of the telecommunications network to exceed the limit, transmitting one or more redirect messages to the telecommunications network through the network interface to redirect the plurality of communications to the destination address associated with the client of the telecommunications network.

12. The virtual service control point of claim 11 wherein the plurality of communications comprise a dialed telephone number associated with the client of the telecommunications network and the incoming communication is a toll-free communication.

13. The virtual service control point of claim 11 wherein the client of the telecommunications network comprises a group of customers to the telecommunications network.

14. The virtual service control point of claim 11, the method further comprising:
   determining a billing policy for the client of the telecommunication network based on a first number of the plurality of incoming communications at a first time.

15. The virtual service control point of claim 14, the method further comprising:
   adjusting the billing policy for the client of the telecommunication network based on a second number of the plurality of incoming communications at a second time, wherein adjusting the billing policy comprises lowering a cost billed to the client of the telecommunications network.

16. The virtual service control point of claim 11 further comprising a database to store the list of the at least one routing feature associated with the client of the telecommunications network and wherein the list of the at least one routing feature is obtained from the database.

17. The virtual service control point of claim 16 wherein the list of the at least one routing feature associated with the client of the telecommunications network is based at least on a service agreement between the client of the telecommunications network and an administrator of the telecommunications network.

18. A method for operating a telecommunications network, the method comprising:
   receiving a plurality of incoming communications from a plurality of users of the telecommunications network, the plurality of incoming communications comprising a dialed telephone number associated with a client of the telecommunications network;
   obtaining a list of at least one routing feature associated with the client of the telecommunications network, wherein the at least one routing feature is a maximum concurrent calling feature configured to restrict a number of concurrent communications to the client of the telecommunications network to a limit;
   applying the at least one routing feature to the plurality of received incoming communications;
   translating the incoming plurality of toll-free communications to a destination address associated with the client of the telecommunications network based at least on the at least one routing feature, the destination address associated with the dialed telephone number; and
   upon determining that a first incoming communication would not cause the concurrent communications to the client of the telecommunications network to exceed the limit, transmitting one or more redirect messages to the telecommunications network through a network interface to redirect the first incoming communication to the destination address associated with a client of the telecommunications network.

19. The method of claim 18 wherein the list of the at least one routing feature associated with the client of the telecommunications network is obtained from a database in communication with the at least one application server and is based at least on a service agreement between the client of the telecommunications network and an administrator of the telecommunications network.

* * * * *